United States Patent [19]

Tighe et al.

[11] 4,430,458
[45] Feb. 7, 1984

[54] HYDROGEL-FORMING POLYMERIC MATERIALS

[75] Inventors: Brian J. Tighe, Birmingham; Howard J. Gee, Derbyshire, both of England

[73] Assignee: Kelvin Lenses Limited, Manchester, England

[21] Appl. No.: 309,688

[22] Filed: Oct. 8, 1981

[51] Int. Cl.$^3$ .................. C08F 220/20; C08F 226/10; C08L 31/02; G02C 7/04
[52] U.S. Cl. ............................... 523/108; 351/160 R; 351/160 H; 526/264
[58] Field of Search .................... 526/264; 351/160 R, 351/160 H; 523/106, 107, 108

[56] References Cited

U.S. PATENT DOCUMENTS

| | | | |
|---|---|---|---|
| 3,767,731 | 10/1973 | Seiderman | 523/108 |
| 3,839,304 | 10/1974 | Hovey | 523/108 |
| 3,937,680 | 2/1976 | de Carle | 523/108 |
| 4,036,788 | 7/1977 | Steckler | 526/264 |
| 4,042,552 | 8/1977 | Grucza | 523/108 |
| 4,123,407 | 10/1978 | Gordon | 523/108 |
| 4,123,408 | 10/1978 | Gordon | 523/108 |

FOREIGN PATENT DOCUMENTS 2091417 1/1972 France.
1566249 4/1980 United Kingdom.

Primary Examiner—Harry Wong, Jr.
Attorney, Agent, or Firm—Stevens, Davis, Miller & Mosher

[57] ABSTRACT

Polymeric materials suitable for bio-medical applications, particularly in making contact lenses, are formed by copolymerization and crosslinking of: (1) an amide of an unsaturated carboxylic acid such as acrylamide or methacrylamide; (2) an N-vinyl lactam, such as N-vinyl pyrrolidone; (3) an ester of an unsaturated carboxylic acid, such as a hydroxy-substituted ester of acrylic or methacrylic acid; (4) an unsaturated carboxylic acid, such as acrylic or methacrylic acid; and (5) a polymerizable hydrophobic vinyl monomer, such as styrene; crosslinking with a crosslinking agent either being carried out during copolymerization or subsequently. The resulting polymeric materials may be machined to produce a contact lens form and then hydrated to form a hydrogel which is suitable for use as an extended wear contact lens.

11 Claims, No Drawings

HYDROGEL-FORMING POLYMERIC MATERIALS

DESCRIPTION

This invention relates to polymeric materials suitable for use in bio-medical applications, in particular in manufacturing contact lenses, where the materials are required to be in contact with living tissues for long periods.

The requirements for polymeric materials in such applications are both precise and severe. The material needs to be fabricable without degradation, inert in a biological environment, and toxicologically inactive. In addition, the material needs to have the required chemical, physical and mechanical properties for the particular application and to be sterilisable without adversely affecting these properties. These problems are particularly acute when the material is used in the manufacture of a contact lens, especially an extended wear contact lens. In that case, the polymeric material should, as well as being optically transparent, possess four more properties of major importance. Firstly, as the lens is to be considered as an extension of the cornea, it is most important that materials should be permeable to gases such as oxygen and carbon dioxide, since the cornea is avascular and acquires oxygen directly from the atmosphere in order to respire. Secondly, the lens should also be easily elastically deformable but recover rapidly in order to minimise disturbance on the cornea whilst avoiding visual instability. Thirdly, the surface of the polymer should be hydrophilic so that the lachrymal fluid may wet the lens sufficiently to maintain a continuous tear film on the lens. Finally, the lens should have a sufficient physical durability to minimise scratching, tearing and splitting in normal, and preferably also abnormal, usage.

One class of polymeric materials which can form extended wear contact lenses are those that form hydrogels when hydrated. Such materials are hard and brittle generally when dry but when swollen with water they have a soft jelly-like elastic consistency. The hydrated lens has far greater compatibility with the eye than a hydrophilic lens and this feature facilitates its function as an extended wear lens. Further, as an extended wear lens is to be considered as an extension of the cornea, it is desirable that the properties of the cornea should be approached as nearly as possible.

If the hydrogel is to have a high oxygen permeability, it must have a high equilibrium water content when hydrated, since the "dissolved" oxygen permeability of hydrogels has been found to increase exponentially with increasing water content.

There is currently no known homopolymer which has the properties desirable for an extended wear lens material as discussed above. Hence, there has been a requirement for the production of a hydrophilic copolymer having a high equilibrium water content together with the other desirable properties mentioned above. Various materials have been developed in the prior art which enable a sufficiently high water content to be reached, but such materials suffer from the disadvantage that they are of insufficient strength to be manipulable without risk of damage such as tearing.

British patent specification No. 1,391,438 describes a copolymer comprising units derived from a hydrophilic olefinically unsaturated monomer containing a heterocyclic group, said units being derived, for example, from N-vinyl pyrrolidone and constituting 50 to 100% by weight of the total hydrophilic monomer components; up to 90% of the total units of the copolymer derived from the olefinically unsaturated hydrophobic monomer such as an alkyl acrylate; and a minor amount of cross-linking units. The Examples illustrate such copolymers which can absorb more than their own dry weight of water upon being immersed in water for 24 hours.

British patent specification No. 1,385,677 describes a contact lens formed from a high water content hydrogel which can contain at least 55% by weight of water. The hydrogel is of a copolymer of hydroxyalkyl acrylate or methacrylate and a copolymerisable N-vinyl lactam, the copolymer having been cross-linked with a minor proportion of a crosslinking monomer. The copolymer can according to this specification contain minor amounts of comonomers such as acrylic or methacrylic acid, alkyl acrylates and methacrylates and styrene.

British patent application No. 36,466/75 (now Serial No. 1,566,249) describes a plastic material suitable for use in bio-medical applications, particularly contact lenses. The material comprises a hydrophilic copolymer of a hydroxyl substituted unsaturated aliphatic compound, an amide of an unsaturated aliphatic carboxylic acid, and a modifier selected from the group consisting of (i) unsaturated aliphatic compounds comprising a group capable of hydrogen bonding with an amide group and (ii) mono esters of unsaturated aliphatic carboxylic acids, the copolymer being one that is capable of absorbing water.

The disadvantage of raising the water content of the polymeric material, which is necessary to improve its oxygen permeability, is that the higher water content tends to result in a weakening of the material. As a result of extensive studies, it has now been found possible according to the present invention, to formulate vinyl polymeric materials which are suitable for biomedical applications, particularly for contact lenses, and which are hydratable to a hydrogel having an equilibrium water content of at least 65% by weight and have a desirably high tear strength.

The polymeric materials of the present invention which enable the above properties to be achieved comprise units derived from the reaction of the following monomers in the given proportions:

(1) 20 to 40 mole % of a polymerisable amide which is an unsubstituted or substituted amide of a carboxylic acid containing olefinic unsaturation.
(2) 25 to 55 mole % of an N-vinyl lactam,
(3) 5 to 20 mole % of a polymerisable ester which is an ester of a carboxylic acid containing olefinic unsaturation,
(4) 1 to 10 mole %, preferably 1 to 3 mole %, of a polymerisable carboxylic acid containing olefinic unsaturation,
(5) 3 to 10 mole %, preferably 5 to 10 mole %, e.g. 7 to 10 mole %, of a polymerisable hydrophobic vinyl monomer, the copolymer being cross-linked with a cross-linking agent in an amount of, for example, up to 5, preferably up to 1, weight %, based on the total weight of the monomers.

The olefinically unsaturated carboxylic acid or derivative thereof used in components (1), (3) and (4) is advantageously one containing a vinyl group of structure $CH_2=C<$ and is preferably acrylic or methacrylic acid.

Component (1) may be an amide or acrylic or methacrylic acid, for example acrylamide, methacrylamide or diacetone acrylamide. This component is present in the copolymer to provide strength and hydrophilicity. It is particularly preferred to use acrylamide alone or together with a mixture of methacrylamide and/or diacetone acrylamide. The latter combination confers a better hydrolytic stability on the material but with a reduced water content compared to acrylamide alone.

The N-vinyl lactam, component (2), is a weakly basic hydrophilic component. The compound may, for example, be N-vinyl pyrrolid-2-one or an alkyl substituted derivative thereof, for example, N-vinyl-5-methylpyrrolid-2-one, N-vinyl-5-ethylpyrrolid-2-one, N-vinyl-5,5-dimethylpyrrolid-2-one, N-vinyl-5,5-diethylpyrrolid-2-one or N-vinyl-5-methyl-5-ethylpyrrolid-2-one. Excellent results have been obtained with N-vinylpyrrolid-2-one.

Component (3) may be a hydroxy substituted ester of acrylic or methacrylic acid and is preferably a hydroxy propyl or hydroxy ethyl ester in particular, hydroxy propyl acrylate or hydroxy ethyl methacrylate, the 2-isomers being the more generally used isomers. This component is less hydrophilic than the lactam component; its incorporation reduces the tendency of blocks of the same monomer to form in the copolymer and hence facilitates the even distribution of water in the hydrated copolymer matrix.

The unsaturated aliphatic carboxylic acid is present as a hydrophilic component and is capable of hydrogen bonding with the donor groups in the other monomers, thereby adding strength to the material. Thus, in order to achieve an appropriate balance of high water content and high strength, the quantities of the acid incorporated in the copolymer matrix and the N-vinyl lactam not incorporated in the copolymer matrix must be carefully controlled.

It is, however, unnecessary for the acid component (4) to be introduced specifically into the mixture of monomers since it may already be present in sufficiently high proportion as an impurity in the hydroxy-substituted ester component (3). An alternative way in which it can be introduced is by conversion of $CONH_2$ groups of the amide component (1) to COOH groups during autoclaving of the materials. These alternatives are intended to be comprehended within the scope of the invention.

A preferred example of the hydrophobic vinyl monomer is styrene. However, other hydrophobic monomers may be used such as the monoesters of unsaturated aliphatic carboxylic acids, preferably esters of acrylic or methacrylic acid, for example, methyl methacrylate. Preferably styrene alone is used or a part of the styrene is replaced by the latter ester. It is possible, by adjusting the amount of the hydrophobic monomer incorporated, to adjust the water content of the material. On hydration, the hydrophobic function of the monomer tends to reach the surface of a contact lens and hence alters the surface properties of the lens in a manner which may facilitate dispersion of foreign proteinaceous matter. Styrene has a further advantage in that, because of the steric hinderance caused by its pendent phenyl groups, chain rotation is hindered and this results in a reduction of the deformability of the copolymer. Styrene also assists in the early formation of a gel and aids the production of a uniform composition. Thus, although high hydrophilicity is required in a contact lens, it is advantageous to include a hydrophobic component, as in the present formulation, in order to reduce the extent to which foreign matter is attracted to the lens.

As an alternative, the necessary cross-linking can be introduced into the copolymer matrix after the main copolymerisation to form a linear chain has been completed. The cross-linking can be introduced in a final compression or injection moulding process in which the final optical form of the lens is produced. Such a method and suitable cross-linking agents are described in U.K. patent specification No. 1,436,705. In this case, it is desirable that the copolymer should be substantially linear at least prior to moulding so that it can undergo viscous flow under the reaction of heat and pressure above its glass transition temperature and permit the use of compression or injection moulding techniques. The proportion of cross-links introduced into the final copolymer will usually be quite small, preferably 1 to every 10 to 200 repeating polymer units on average and most preferably 1 to every 60 to 100 polymer units. Examples of suitable cross-linking agents which can be used during the main copolymerisation are the diesters of unsaturated aliphatic carboxylic acid, such as ethylene glycol dimethacrylate and polyethylene oxide (for example of molecular weight 400) dimethacrylate or divinyl benzene. When the cross-linking agent is to be added immediately prior to moulding, it may be a diamide of an unsaturated aliphatic carboxylic acid, an anhydride of an aliphatic or aromatic carboxylic acid, a diepoxide or dicumyl peroxide. In the case of such cross-linking agents as ethylene glycol dimethacrylate there may be no necessity to add these specifically since, if hydroxyethyl methacrylate is used as component (3) this may contain sufficient of the diester as impurity to cross-link the material effectively.

In addition to the monomeric component described above, the material may also include small amounts of monomers which improve the physical properties of the polymer. For example, the antibacterial properties of the copolymer can be improved by the inclusion of an olefinically unsaturated halogenated phenol.

The polymerisation of the components is suitably carried out in a bulk polymerisation system and initiated by radical initiators or catalysts, or by other radical-generating techniques such as photo initiation for example using u.v. rays.

The polymerisation may be carried out in bulk by mixing the monomer composition with a suitable catalyst in a sealed polyethylene tube to produce rods from which lenses may be lathe cut. Suitable initiators are t-butyl peroctoate, methyl ethyl ketone peroxide and azobisisobutyronitrile.

In bulk polymerisation a number of problems arise because of the presence of the carboxylic acid amide. There are basically three major problems, the first problem stemming from the fact that acrylamide and its derivatives are solids which have only a limited solubility in the other monomers. This may be illustrated by the fact that the molar % solubility of acrylamide in a monomer such as hydroxy propyl acrylate at room temperature is 33 mole % acrylamide in 67 mole % hydroxypropylacrylate. The problem was therefore to find a way to incorporate more acrylamide and yet retain a clear solution at room temperature. This can be overcome by addition of an appropriate amount of water to the reaction mixture thus obtaining a clear solution at room temperature with a greatly increased acrylamide content.

But, because of the problems inherent in using water to dissolve the amide, i.e. that the water must be removed before the material can be lathe cut, the problem arises of finding a range of formulations to overcome the amide solubility problem without adversely affecting other properties. This problem has been overcome by the use of the monomers specified as (2) to (5) in the present invention.

The second problem arises from the fact that the polymerisation of acrylamide containing compositions is known to be violent unless mild conditions of polymerisation are used. If however, the polymerisation is slow, this tends to result in rods of uneven composition with distorted (pyramid-like) shape because of side reactions. It has been found that the use of the initiator methylethylketone peroxide can help to produce good quality rods via rapid, yet non-violent, polymerisation of acrylamide-containing compositions at low temperatures.

The final problem is caused by the fact that the monomers used in preparing the material have different reactivity ratios which also vary with the polymerisation conditions, and hence the resulting rods tend to contain residual monomer which gives rise to tackiness and softening of the rod in some cases. Whilst post-cure and heat treatment in a vacuum removes the tackiness, it also inherently causes discolouration of the rods. Immersion and washing of the rods in suitable solvents, e.g. acetone, for 2 hours followed by washing with methanol can overcome the problem of tackiness as an alternative to prolonged post-cure.

The polymerisation takes place in two distinct stages, firstly gellation which is suitably carried out at a temperature of 40° C. to 70° C., but is generally in the range of 60° C. to 70° C. The gellation is normally complete within 1 to 4 days e.g. within 48 hours depending upon the temperature used, the nature and amount of the catalyst, the relative proportion of the monomers and the nature of any solvent present. This is then followed by a post-cure which is performed at a higher temperature e.g. 70° C. to 100° C., to complete the polymerisation and harden the rod. This latter stage is normally complete in several hours, e.g. up to 10 hours.

After polymerisation the copolymer may, if necessary, be treated to remove the residual monomer, solvent or initiators, washed and dried under vacuum.

Finally the shaped article is immersed in water or an aqueous medium until equilibrium is reached. The equilibrium water content of the copolymer depends on the nature of the copolymer and its structure and according to this invention will always be in excess of 65% by weight, usually in excess of 70% by weight, for example 73% by weight at 20° C. (Water content is measured as weight of water based on weight of hydrogel (i.e. copolymer when swollen with the water)). High oxygen permeabilities are thus achieved, for example, of the order of 400 to 500, e.g. 480, $\times 10^{-10}$ at 34° C., the units being $cm^3$ (STP) mm $cm^{-2} sec^{-1} cm^{-1}$ Hg. This level of transmission compares with the theoretical requirement for extended wear of 200 to $300 \times 10^{-10}$ at 34° C. and is over six times higher than the corresponding value for hydrated polyhydroxyethylmethacrylate.

When swollen in water, the polymeric materials are in the form of hydrogels which are particularly suitable for use in making extended wear contact lenses. However, the polymeric material of the invention may be used in other instances where it is required to come into contact with living tissue. Examples of such applications are surgical implants and prosthetic devices for example blood vessels, artificial urethers, heart valves and artificial breast tissue. The polymeric material is also useful for contact with body fluids outside the body, for example, in manufacturing membranes for kidney dialysis and heart/lung machines, swabs, nappy liners, wound dressings and similar applications. The increased strength of the polymeric materials when hydrated, together with their ability to be hydrated to such a great extent, make them particularly valuable in these applications.

The invention will now be illustrated by reference to the following Examples.

EXAMPLE 1

Recrystallised acrylamide (23.67 g), was dissolved in a mixture of N-vinylpyrrolid-2-one (52.70 g), 2-hydroxypropylacrylate (13.13 g) and styrene (10.50 g). (All liquid monomers having been purified by vacuum distillation). The dissolution was aided by heating the mixture and after cooling the mixture was filtered to remove debris.

To the filtered solution was added, methacrylic acid (1.0 g), ethylenedimethacrylate (1.0 g) and t-butyl peroctoate (0.14 g). The solution was thoroughly mixed, split into portions, each of 20 g, and poured into previously prepared high density polyethylene moulds. Each mould was individually degassed with nitrogen (high purity) for five minutes. Each mould was sealed and the polymerisation carried out at 60° C. for 48 hours in a constant temperature water bath. To complete the polymerisation, the gelled rod was heated in an oven at 100° C. for a further 2 hours. The mould was stripped away to yield a hard glassy polymer (designated JW1), which when machined into a contact lens and allowed to equilibrate with 0.9% saline for 4 days had an equilibrium water content at 20° C. of 72.4% by weight.

EXAMPLE 2

Recrystallised acrylamide (29.34 g) was dissolved in a mixture of N-vinylpyrrolid-2-one (40.14 g), 2-hydroxypropylacrylate (20.15 g), styrene (8.6 g) and methacrylic acid (1.78 g). The mixture was heated to aid dissolution of the acrylamide, and the solution had to be maintained at an elevated temperature to avoid precipitation of the acrylamide. When dissolution was complete, ethylene dimethacrylate (1.0 g) and methylethylketone peroxide (1.0 g) were added to the solution.

The mixture was split into portions, each of 20 g, and transferred to previously prepared high density polyethylene moulds, maintained at an elevated temperature in a water bath, where each mould was degassed with nitrogen (high purity) and the moulds sealed. Polymerisation was carried out at 40° C. for 168 hours, 60° C. for 72 hours, and 80° C. for 2 hours. The moulds were stripped away to yield a hard glassy polymer (designated IM1), which when machined into a contact lens and allowed to equilibrate with 0.9% saline for 4 days, had an equilibrium water content at 20° C. of 77.0% by weight.

We claim:

1. A contact lens in the form of a hydrogel containing at least 65% by weight of water and comprising a crosslinked polymeric material containing units derived either by simultaneous copolymerization and crosslinking or by copolymerization and subsequent crosslinking of the following monomers:

(1) 20 to 40 mole % of an amide of acrylic or methacrylic acid;
(2) 25 to 55 mole % of an N-vinyl lactam of the N-vinyl pyrrolidone type;
(3) 5 to 20 mole % of an hydroxyalkyl ester of acrylic or methacrylic acid;
(4) 1 to 10 mole % of acrylic or methacrylic acid; and
(5) at least about 5 up to about 10 mole % of a polymerizable hydrophobic vinyl monomer which is at least one monomer selected from the group consisting of vinyl aromatic hydrocarbons of the styrene type and hydrophobic esters of acrylic or methacarylic acid;

the monomers (1) to (5) totalling 100 mole %, the crosslinking having been effected with crosslinking amounts of a crosslinking agent, which, in the case of simultaneous copolymerization and crosslinking, is an ester of a diol and acrylic or methacrylic acid or is divinylbenzene, or, in the case of crosslinking subsequent to copolymerization, is a latent crosslinking agent which is a diamide of an unsaturated aliphatic carboxylic acid, an anhydride of an aliphatic or aromatic carboxylic acid, a diepoxide or dicumyl peroxide, the crosslinking agent having been used in an amount of up to 5 weight % based on the total weight of monomers (1) to (5).

2. A lens according to claim 1 wherein component (1) is acrylamide, methacrylamide or diacetone acrylamide or a mixture of two or all of these.

3. A lens according to claim 1 wherein component (2) is N-vinylpyrrolid-2-one.

4. A lens according to claim 1 wherein component (3) is hydroxy-propyl acrylate or hydroxy-ethyl methacrylate.

5. A lens according to claim 1 wherein component (5) is styrene, an ester of acrylic or methacrylic acid or a mixture thereof.

6. A lens according to claim 1 wherein the polymeric material is crosslinked with up to 1 part by weight of the crosslinking agent based on 100 parts by weight of monomers (1) to (5).

7. A lens according to claim 1 wherein the crosslinking agent used in the case of simultaneous copolymerization and crosslinking is ethylene glycol dimethacrylate, a polyethylene oxide dimethacrylate or divinylbenzene.

8. A process for preparing a contact lens in the form of a hydrogel containing at least 65% by weight of water, which process comprises:
(a) simultaneously copolymerizing and crosslinking in a mold a monomer mixture comprising:
  (1) 20 to 40 mole % of an amide of acrylic or methacrylic acid;
  (2) 25 to 55 mole % of an N-vinyl lactam of the N-vinyl pyrrolidone type;
  (3) 5 to 20 mole % of an hydroxyalkyl ester of acrylic or methacrylic acid;
  (4) 1 to 10 mole % of acrylic or methacrylic acid; and
  (5) at least about 5 up to about 10 mole % of a polymerizable hydrophobic vinyl monomer which is at least one monomer selected from the group consisting of vinyl aromatic hydrocarbons of the styrene type and hydrophobic esters of acrylic or methacrylic acid; the crosslinking being effected with crosslinking amounts of a crosslinking agent which is an ester of a diol and acrylic or methacrylic acid or is divinylbenzene used in an amount of up to 5 parts by weight based on 100 parts by weight of monomers (1) to (5) to form a crosslinked copolymer;
(b) cutting the crosslinked polymer of step (a) to produce a lens form;
(c) immersing the lens form of step (b) in water or an aqueous medium until equilibrium is reached to form a contact lens in the form of a hydrogel containing at least 65% by weight of water.

9. A process according to claim 8 wherein t-butyl peroctoate or methyl ethyl ketone peroxide is added as initiator in step (a).

10. A process according to claim 8 wherein the crosslinking agent is ethylene glycol dimethacrylate, polyethylene oxide dimethacrylate or divinyl benzene.

11. A process of preparing a contact lens in the form of a hydrogel containing at least 65% by weight of water, which process comprises:
(i) forming a linear copolymer by copolymerizing a monomer mixture comprising:
  (1) 20 to 40 mole % of an amide of acrylic or methacrylic acid;
  (2) 25 to 55 mole % of an N-vinyl lactam of the N-vinyl pyrrolidone type;
  (3) 5 to 20 mole % of an hydroxyalkyl ester of acrylic or methacrylic acid;
  (4) 1 to 10 mole % of acrylic or methacrylic acid; and
  (5) at least about 5 up to about 10 mole % of a polymerizable hydrophobic vinyl monomer which is at least one monomer selected from the group consisting of vinyl aromatic hydrocarbons of the styrene type and hydrophobic esters of acrylic or methacrylic acid;
(ii) compression or injection molding the linear copolymer of step (i) in the presence of a crosslinking amount of a crosslinking agent which is a diamide of an unsaturated aliphatic carboxylic acid, an anhydride of an aliphatic or aromatic carboxylic acid, a diepoxide or dicumyl peroxide, the crosslinking agent being used in an amount of up to 5 weight % based on the total weight of monomers (1) to (5), to produce a lens form and
(iii) immersing the lens form of step (ii) in water or an aqueous medium until equilibrium is reached to form a contact lens in the form of a hydrogel containing at least 65% by weight of water.

* * * * *